(12) United States Patent
Heris et al.

(10) Patent No.: US 8,633,266 B2
(45) Date of Patent: Jan. 21, 2014

(54) TIN-FREE STABILIZER COMPOSITION

(75) Inventors: Cagan Heris, Narlidene/Izmir (TR);
Tarkan Uysal, Hatay/Izmir (TR);
Michael Schiller, Arnoldstein (AT)

(73) Assignee: Akdeniz Kimya San. ve Tic. A.S. (TR)

( * ) Notice: Subject to any disclaimer, the term of this patent is extended or adjusted under 35 U.S.C. 154(b) by 59 days.

(21) Appl. No.: 13/105,417

(22) Filed: May 11, 2011

(65) Prior Publication Data

US 2011/0306695 A1  Dec. 15, 2011

(30) Foreign Application Priority Data

May 11, 2010  (DE) .......... 10 2010 020 263

(51) Int. Cl.
*C08K 5/098* (2006.01)
*C08K 5/09* (2006.01)
*C08K 5/34* (2006.01)
*C08K 5/3477* (2006.01)

(52) U.S. Cl.
USPC ........... 524/101; 524/100; 524/284; 524/300; 524/323; 524/331; 252/400.61; 252/401

(58) Field of Classification Search
USPC ........ 252/182.29, 400.61, 401; 524/145, 100, 524/101, 284, 300, 323, 331
See application file for complete search history.

(56) References Cited

U.S. PATENT DOCUMENTS

| | | | |
|---|---|---|---|
| 5,232,957 A | 8/1993 | Pritchard | |
| 5,241,094 A | 8/1993 | Razvan | |
| 5,312,941 A | 5/1994 | Razvan | |
| 2003/0209696 A1 | 11/2003 | Reith | |
| 2007/0293612 A1 | 12/2007 | Reith | |
| 2008/0023673 A1 | 1/2008 | Reith | |
| 2008/0132616 A1* | 6/2008 | Reith | ............... 524/101 |
| 2009/0105387 A1 | 4/2009 | Wehner | |
| 2009/0131564 A1 | 5/2009 | Wehner | |

FOREIGN PATENT DOCUMENTS

| | | |
|---|---|---|
| DE | 4204887 | 8/1993 |
| EP | 0282912 | * 3/1988 |
| WO | 2010/060966 | 6/2010 |
| WO | 2011/054536 | 5/2011 |

OTHER PUBLICATIONS

Dero, "The future of tin stabilizers in PVC applications", PVC Formulation Conference, Cologne, France, pp. 16-18 (2010).
Zweifel et al., "Plastics Additives Handbook", Carl Hanser Verlag (Publisher), 6th ed., pp. 539-579 (2009).

* cited by examiner

*Primary Examiner* — James J Seidleck
*Assistant Examiner* — Deve E Valdez
(74) *Attorney, Agent, or Firm* — McDonnell Boehnen Hulbert & Berghoff LLP

(57) ABSTRACT

A stabilizer composition for halogenated polymers comprising at least one zinc salt of a carboxylic acid and/or of a β-diketone, comprising a metal salt of the carboxylic acid selected from the group of the following metals: Li, Na, K, Mg, Ca, Al and Zn;

a metal salt of the β-diketone selected from the group of the following metals: Li, Na, K, Mg, Ca, Al and Zn; and an amino alcohol derivative.

8 Claims, No Drawings

TIN-FREE STABILIZER COMPOSITION

This application claims priority to German patent application DE 10 2010 020 263.0 filed on May 11, 2010, which is incorporated by reference herein in its entirety.

The invention relates to a tin-free composition for stabilization of halogenated polymers, especially polyvinyl chloride (PVC), which can replace tin stabilizers in profile and siding applications.

Halogenated polymers or plastics or moldings produced therefrom tend to substantial alterations during the production process therefor and due to the effect of environmental influences. For example, this kind of plastics can decompose or discolor under the influence of heat and/or light. For stabilization of halogenated polymers, a wide variety of substances or substance mixtures have therefore already been used.

A halogenated polymer, for example polyvinyl chloride (PVC), is converted to a polyene structure in the course of melt forming, which eliminates hydrochloric acid and discolors the polymer. In order to improve the thermal stability of the polymer, it is customary to incorporate mono- and dialkyltin compounds into the resin as stabilizers.

With regard to the prior art, it is necessary firstly to distinguish between the tin stabilizers on the one hand and the calcium-zinc systems on the other. In the 1930s, the first tin compounds were proposed as PVC stabilizers. Many tin stabilizers contain sulfur components. In this case, reference is made to organotin mercaptides or sulfur-containing organotin stabilizers.

While stabilizers based on lead and calcium-zinc are still market-leading in Europe, tin-based stabilization is predominant in North America.

Organotin mercaptides are a very effective and universally usable group of the tin stabilizers. A distinction is drawn between monoalkyl- and dialkyltin compounds. (Trialkyltin compounds are toxic and were used, for example, for marine paints.) The toxicity tends to rise with the number of alkyl groups on the tin. Thus, the labeling of the dialkyltin stabilizers in Europe has also changed, or will change. Dibutyltin stabilizers will in the future fall into the categories of reprotoxic cat. 2 and mutagenic cat. 3 (B. Dero: "The Future of tin stabilisers in PVC applications" PVC Formulation conference Cologne, 16-18 Mar. 2010). The alkyl groups may contain methyl ($CH_3$—), n-butyl ($C_4H_9$—), n-octyl ($C_8H_{17}$—) and n-dodecyl radicals which are also known as lauryl ($C_{12}H_{25}$—).

The sulfur-containing molecular constituents are based firstly usually on i-octyl thioglycolate, or on the somewhat longer-chain i-octyl β-mercaptopropionate. In these substances, tin is bonded to the sulfur of the acid. The "sequence" in the tin stabilizer here is tin-alcohol-acid.

Secondly, oleic esters of 2-mercaptoethanol (HS—CH2-CH2-OH) are also used. In this case, tin is bonded to the sulfur of the alcohol component. Reference is also made to "reverse esters" because the "sequence" in the tin stabilizer here is tin-alcohol-acid.

The methyl-substituted derivatives are more volatile than the longer-chain relatives thereof (homologs). Consequently, the maximum workplace concentration of 0.1 mg of tin/$m^3$ is of significance. Methyltin compounds have been and are being used in the USA and also in Japan for the extrusion of pipes. In the USA, they are also of significance in the stabilization of profiles and sidings. Finally, it has not been clarified 100% whether highly toxic dimethyltin chloride is released in the case of stabilization with methyltin compounds. There are numerous arguments for and against this.

The butyl-substituted derivatives are used principally in the United States in many industrial products, such as (window) profiles, sidings, injection moldings, films, sheets, floor coverings, carpets . . . . The exception is food contact and contact with drinking water, since butyltin mercaptides are labeled with a skull and crossbones due to their toxicological properties.

In most cases, the processors of tin stabilizers have their own knowhow with regard to lubricant matching. In contrast, calcium-zinc onepacks contain not only stabilizing constituents but also lubricants.

Substitution of tin stabilizers is often found to be quite difficult because calcium-zinc stabilizers have strong rheological influences, have a very high dosage compared to the pure tin stabilizer and corresponding costs, and often do not attain the required color values.

The Prior Art Regarding Calcium-zinc Stabilizers

With different ratios of alkaline earth metal to zinc salts, it is possible in principle to establish all stabilities and starting colors. If the alkaline earth metal soap predominates, good stabilities are achieved with relatively modest starting color. If zinc salts predominate, the better is the color with probably acceptable stability. The formation of the zinc chloride according to formula 1 or formula 2, which promotes decomposition of the halogenated polymer, gives rise to the need to add costabilizers. These costabilizers either bind hydrochloric acid or complex the Lewis acids, i.e. zinc chloride in this case. Typical costabilizers are hydrotalcites, zeolites, metal (hydr)oxides, polyols, β-diketones, organic phosphites, antioxidants, epoxides, perchlorates, etc.

Commercially available window profile stabilizers are used at a use amount of the stabilizer of approx. 3.5 to 4.5 per 100 parts of resin (phr=per hundred resin). In contrast, tin stabilizers, for example for production of window profiles, are used at 0.8 to 1.5 phr plus 1.5 to 2.5 phr of a lubricant combination. Such stabilizer combinations enable the production of window profiles with good thermal and light stability in combination with a good starting color. Good light and weathering stability is obtained for tin-stabilized profiles only when much more titanium dioxide is used than is the case for calcium-zinc-stabilized profiles.

Due to the poorer weathering stability of tin stabilizers given the same amount of titanium dioxide and the toxicological concerns, the problem addressed is that of developing a tin-free alternative which has only minor rheological effects, if any,
enables the same lubricant combination as tin stabilizers,
has properties comparable to the tin system, such as color, gloss and stability,
but much better weathering characteristics than tin stabilizers, and
which differ in terms of dosage by not more than +50% from the amount of tin stabilizer used.

This problem was surprisingly solved by the features of the composition as claimed in claim 1. The combination of metal soaps and metal acetylacetonates of calcium and of zinc with tris(2-hydroxyethyl) isocyanurate (THEIC) is known in principle.

EP 1088032 describes, in its working examples A1 to A6, stabilizer combinations which contain 0.8 phr of zinc stearate, 0.3 phr of calcium acetylacetonate (Caacac) and 0.3 phr of THEIC. In the same document, in examples B1 to B9, stabilizer combinations containing 0.8 phr of zinc stearate, 0.3 phr of calcium stearate, 0.3 phr of calcium acetylacetonate (Caacac) and 0.3 phr of THEIC are used. By virtue of the addition of acid scavengers, DHC values of approx. 25 minutes are achieved in examples A1 to A3, and of 20 to 50 min in examples B1 to B3. Only by the addition of calcium hydroxide are higher DHC values achieved. Color values are not specified at all, which complicates discussion.

EP 1613696 describes, in example 4, stabilizer combinations which comprise 0.2 phr of zinc stearate, 0.2 phr of zinc octoate, only 0.1 phr of THEIC and 0.0 or 0.4 phr of Caacac. The formulations again attain DHC values of 22 to 32 min. The color of the Caacac-free dryblends is superior to those comprising 0.4 phr of Caacac in terms of the b value.

EP 1692220 describes, in the examples, stabilizer combinations which comprise 0.5 phr of zinc stearate, 0.3 phr of zinc caprylate, 0.3 phr of THEIC and 0.01 to 0.30 phr of Caacac. By virtue of the addition of 0.5 phr of calcium hydroxide in addition to other acid scavengers, DHC values of up to 66 min are attained. Two teachings are to be found in this application. The more Caacac is used, the higher the DHC value becomes and the poorer the surface becomes.

EP 1769022 describes stabilizer combinations comprising 1.1 phr of zinc stearate, 0.18 phr of THEIC and 0.0 or 0.1 phr of Caacac. In UV irradiation, it is found that the Caacac-free formulation bleaches later than that containing Caacac.

It has been found that, surprisingly, the inventive stabilizer compositions impart, to PVC profiles and the parts and products produced therefrom, a very good starting color, excellent color retention, very good surface characteristics and very good gloss, and an increased stability to the action of sunlight and artificial light, and better toxicological potential.

More particularly, the starting color and the color retention of the halogen-containing material can be improved significantly compared to other organic and inorganic costabilizers when it is used in outdoor applications, for example in profiles or sidings. In addition, it has been found that, through use of the inventive stabilizer compositions, shaped bodies can be produced without any problem from halogenated polymers, which enable optimal performance in use and which are indeed superior to the products produced based on tin or based conventionally on calcium-zinc for PVC stabilization. This stabilizing effect also occurs when the PVC comprises further stabilizers, costabilizers or assistants.

The present invention likewise provides for the use of the inventive stabilizer composition for stabilization of PVC profiles, sheets and sidings, and to the PVC profiles, sheets and sidings which comprise a stabilizer composition according to the invention.

The inventive stabilizer composition of the present invention can be used for halogenated polymers. Examples of such halogenated polymers may be thermoplastic halogenated polymers, for example, without any restriction thereto, polyvinyl chloride (PVC), polyvinylidene chloride, chlorinated or chlorosulfonated polyethylene, chlorinated polypropylene or chlorinated ethylene/vinyl acetate copolymer or similar compounds. Particularly advantageous are polymers of the PVC type, i.e. vinyl chloride homopolymers and copolymers of vinyl chloride with other monomers.

The stabilizer compositions for halogenated polymers according to the present invention comprise at least a metal salt of a carboxylic acid having one to 100 carbon atoms. The metal is selected from the group of Li, Na, K, Mg, Ca, Al and Zn. The carboxylic acid may be unbranched, branched, aromatic, saturated and/or unsaturated. It may also be mono- or polybasic. Examples of suitable carboxylic acid anions include anions of mono- and divalent carboxylic acids such as acetic acid, propionic acid, butyric acid, valeric acid, hexanoic acid, enanthic acid, octanoic acid, neodecanoic acid, 2-ethylhexanoic acid, pelargonic acid, decanoic acid, undecanoic acid, dodecanoic acid, tridecanoic acid, myristic acid, palmitic acid, lauric acid, isostearic acid, stearic acid, 12-hydroxystearic acid, 9,10-dihydroxystearic acid, oleic acid, 3,6-dioxaheptanoic acid, 3,6,9-trioxadecanoic acid, behenic acid, benzoic acid, p-tert-butylbenzoic acid, dimethylhydroxybenzoic acid, 3,5-di-tert-butyl-4-hydroxybenzoic acid, toluic acid, dimethylbenzoic acid, ethylbenzoic acid, n-propylbenzoic acid, salicylic acid, p-tert-octylsalicylic acid, sorbic acid, anions of divalent carboxylic acids or monoesters thereof, such as oxalic acid, malonic acid, maleic acid, fumaric acid, adipic acid, tartaric acid, cinnamic acid, mandelic acid, malic acid, glycolic acid, polyglycoldicarboxylic acids having a degree of polymerization of about 10 to about 12, phthalic acid, isophthalic acid, terephthalic acid or hydroxyphthalic acid, anions of tri- or tetravalent carboxylic acids or the mono-, di- or triesters thereof, as in hemimellitic acid, trimellitic acid, pyromellitic acid or citric acid, and additionally what are called overbased carboxylates, as described, for example, in DE 4106404 or DEA 4002988, the disclosure of the latter documents being considered to form part of the disclosure of the present text.

The inventive stabilizer composition further comprises a metal salt of a β-diketone. The metal is selected from the group of Li, Na, K, Mg, Ca, Al and Zn. The β-diketone is selected from the group of acetylacetone and Ph-CO—CH$_2$—CO—R, where R in turn is an aromatic (e.g. phenyl=Ph) or an alkyl radical having 1 to 20 carbon atoms an amino alcohol derivative of the general formula (I)-(III)

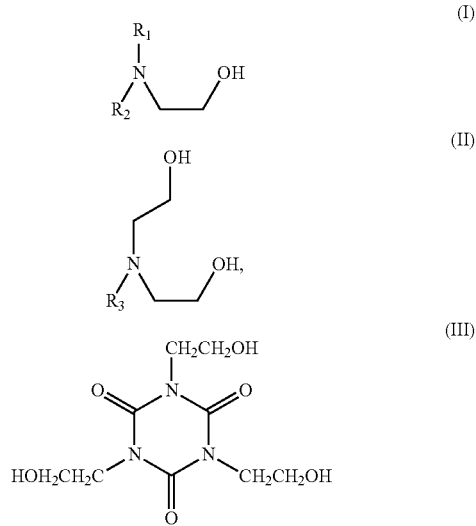

where R1 and R2 are each independently H or CH$_2$CH$_2$OH, and R3 is a cyclic, acyclic, linear and/or branched alkyl radical having 18 carbon atoms.

According to the invention, the stabilizer composition comprises at least one zinc salt of one of the above-mentioned carboxylic acids and/or of one of the abovementioned β-diketones.

The stabilizer composition according to the present invention can be added in a total amount of about 0.5 to 2.5 parts per 100 parts of resin (phr).

In one embodiment, the stabilizer composition is added in an amount of about 0.6 to 2.0 phr, for example in an amount of about 0.8 to about 1.8.

The stabilizer composition comprises preferably more than 0.2 phr of the metal salt of the β-diketone and/or more than 0.4 phr of the amino alcohol.

The stabilizer composition used in accordance with the invention can be added individually to the polymer or to the polymer mixture. However, it is also possible to add the inventive combination together with other (co)stabilizers or the assistants listed below to the polymer or a polymer mixture. For example, dosage in the extruder, for example in the vacuum zone, is likewise encompassed by the present invention.

The inventive stabilizer composition may additionally be combined with one or more additional additives, for example primary stabilizers, costabilizers, zeolites, antioxidants, fillers, plasticizers, dyes, pigments, antistats, surface-active agents, blowing agents, impact modifiers, UV stabilizers, lubricants, processing agents or the like.

Costabilizers are compounds which make a further stabilizing contribution for halogenated polymers when used in the stabilizer composition according to the present invention. Possible costabilizers can be selected from the group consisting of 1,3-diketone compounds, dihydro-pyridines, polyols, isocyanurates, metal salts, natural or synthetic minerals such as hydrotalcites, hydrocalumites, zeolites, amino acid derivatives, organic esters of phosphorous acid, epoxy compounds, perchlorates and salts of superacids.

Examples of 1,3-diketone compounds include, but are not limited to, dibenzoylmethane, stearoylbenzoylmethane, palmitoylbenzoylmethane, myristoylbenzoylmethane, lauroylbenzoylmethane, benzoylacetone, acetylacetone, tribenzoylmethane, diacetylacetobenzene, p-methoxystearoylacetophenone, ethyl acetoacetate and acetylacetone.

Costabilizers from the group of the polyols include, but are not limited to, glycerol, pentaerythritol, di- and tripentaerythritol, trimethylolpropane (TMP), di-TMP, sorbitol, mannitol, malititol, saccharides, disaccharides (especially sucrose, 4-O-β-D-galactopyranosyl-D-glucose, 4-O-alpha-D-glucopyranosyl-D-glucose, 6-O-(6-deoxy-alpha-L-mannopyranosyl)-D-glucose, alpha-D-glucopyranosyl-alpha-D-glucopyranoside, 6-O-alpha-D-glucopyranosyl-D-glucose, 4-O-β-D-glucopyranosyl-D-glucose, 2-O-β-D-glucopyranosyl-D-glucose, 6-O-alpha-D-glucopyranosyl-D-glucitol, 3-O-alpha-D-glucopyranosyl-D-fructose, 6-O-β-D-glucopyranosyl-D-glucose, 4-O-β-D-galactopyranosyl-D-glucitol, 4-O-alpha-D-glucopyranosyl-D-glucitol, 6-O-alpha-D-galactopyranosyl-D-glucose, 3-O-alpha-D-galactopyranosyl-D-myo-inositol, 4-O-β-D-galactopyranosyl-D-fructose, 4-O-β-D-galactopyranosyl-β-D-glucopyranose, 6-O-alpha-D-glucopyranosyl-D-fructose, 4-O-β-D-galactopyranosyl-alpha-D-glucopyranose, 2-O-(6-deoxy-alpha-L-mannopyranosyl)-D-glucose, 4-O-alpha-D-glucopyranosyl-D-fructose, 2-O-β-D-glucopyranosyl-alpha-D-glucopyranose, 1-O-alpha-D-glucopyranosyl-D-mannitol, 6-O-(6-deoxy-alpha-L-mannopyranosyl)-β-D-glucopyranose, 2-O-β-D-glucopyranosyl-β-D-glucopyranose, 6-O-alpha-D-glucopyranosyl-alpha-D-glucopyranose, 2-O-alpha-D-glucopyranosyl-alpha-D-glucopyranose, 2-O-alpha-D-glucopyranosyl-β-D-glucopyranose, 1-O-alpha-D-glucopyranosyl-D-fructose, 6-O-alpha-D-glucopyranosyl-alpha-D-fructo-furanose, 6-O-alpha-D-glucopyranosyl-D-glucitol, 4-O-β-D-galactopyranosyl-D-glucitol, 4-O-alpha-D-glucopyranosyl-D-glucitol, 1-O-alpha-D-glucopyranosyl-D-mannitol), tri-saccharides, polysaccharides, especially polyvinyl alcohols, starch, cellulose and partial esters thereof.

Examples of antioxidants include, but are not limited to, alkylphenols, hydroxyphenyl propionates, hydroxybenzyl compounds, alkylidenebisphenols, thiobisphenols and amino-phenols, especially, for example, 2,6-di-tert-butyl-4-methylphenol, 2,6-di-benzyl-4-methylphenol, stearyl 3-(3'-5'-di-tert-butyl-4'-hydroxyphenyl)propionate, 4,4'-thiobis-(3-methyl-6-tert-butylphenol), 4-nonylphenol, 2,2'-methylenebis(4-methyl-6-tert-butylphenol), 2,5-di-tert-butyl-hydroquinone, 4,4',4"-(1-methyl-1-propanyl-3-ylidene)-tris [2-(1,1-dimethylethyl)-5-methylphenol, the neutral or basic lithium, magnesium, calcium and aluminum salts thereof, and also sterically hindered amines and/or phosphonites and mixtures thereof.

Examples of costabilizers from the group of the metal salts include, but are not limited to, hydroxides, oxides, carbonates, basic carbonates and carboxylic salts of lithium, sodium, potassium, magnesium, calcium, aluminum, titanium and the like. In one embodiment of the present invention, the metal salts may be salts of carboxylic acids.

Examples of natural and synthetic minerals include, but are not limited to, A3, A4, A5 zeolites, zeolites of the mordenite, erionite, faujasite X or Y type, and ZSM-5 zeolites, hydrotalcites (of the Alcamizer 1 and 4 type), hydrocalumites, katoites, garnets, calcium-aluminum-hydroxy salts, calcium-aluminum-zinc-hydroxy salts and/or mixtures thereof.

Examples of costabilizers from the group of the amino acid derivatives include, but are not limited to, glycine, alanine, lysine, tryptophan, acetylmethionine, pyrrolidone-carboxylic acid, α-aminocrotonic acid, α-aminoacrylic acid, α-aminoadipic acid and the like, and the corresponding esters thereof. The alcohol components of these esters may be monohydric alcohols, for example methyl alcohol, ethyl alcohol, propyl alcohol, i-propyl alcohol, butyl alcohol, α-ethylhexanol, octyl alcohol, i-octyl alcohol, lauryl alcohol, stearyl alcohol and the like, and also polyols, for example ethylene glycol, propylene glycol, 1,3-butane-diol, 1,4-butanediol, glycerol, diglycerol, trimethylolpropane, pentaerythritol, dipentaerythritol, erythritol, sorbitol, mannitol and the like.

Examples of costabilizers from the group of the esters of phosphorous acid include, but are not limited to, triaryl phosphites, for example triphenyl phosphite, tris(p-nonylphenyl) phosphite; alkyl aryl phosphites, for example monoalkyl diphenyl phosphites, for example diphenyl isooctyl phosphite, diphenyl isodecyl phosphite; and dialkyl monophenyl phosphites, for example phenyl diisooctyl phosphite, phenyl diisodecyl phosphite; and trialkyl phosphites, such as triisooctyl phosphite, tristearyl phosphite and the like.

Examples of costabilizers from the group of the epoxy compounds include, but are not limited to, various animal or vegetable oils, for example epoxy soya oil, epoxy rapeseed oil, epoxidized carboxylic esters, for example epoxidized epoxy methyl oleate, epoxy butyl oleate, epoxidized alicyclic compounds, glycidyl ethers, for example bisphenol A diglycidyl ether, bisphenol F diglycidyl ether; glycidyl esters such as glycidyl acrylate, glycidyl methacrylate, polymers and copolymers thereof; and epoxidized polymers, such as epoxidized polybutadiene, epoxidized ABS, and the like.

Illustrative isocyanurates in the context of the invention are, but are not limited to,

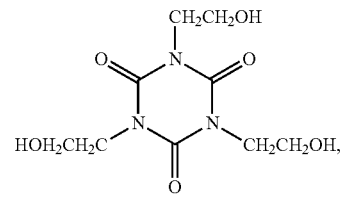

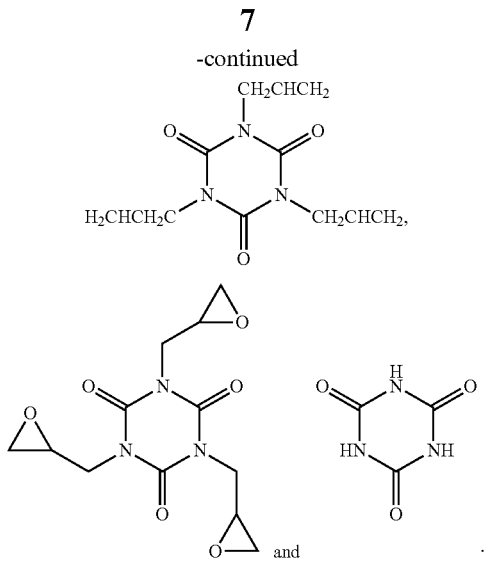

It should be noted that, in the context of the invention, some isocyanurates having at least one hydroxyl group can also be referred to as amino alcohols.

Illustrative dihydropyridines are, but are not limited to,

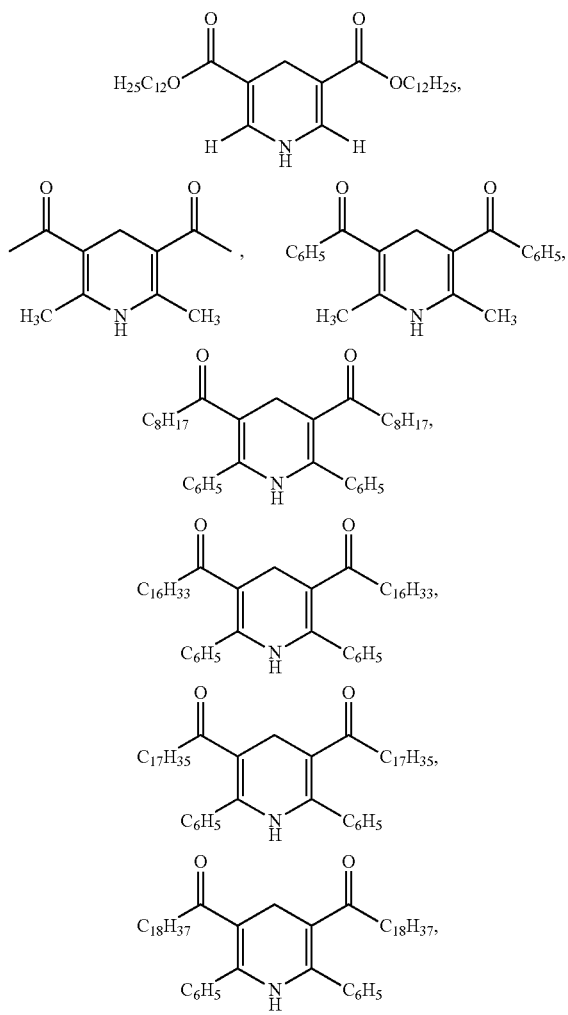

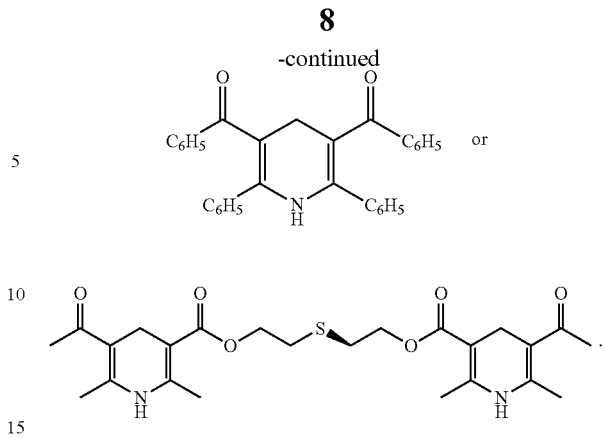

Illustrative perchlorates are, but are not limited to, $NaClO_4$, $Ca(ClO_4)_2$, $Mg(ClO_4)_2$ or $Al(ClO_4)_3$. Further illustrative compounds of this group are Alcamizer 5 and Alcamizer 5-2 from Kyowa, or the triethanolamine-alkalimetal-perchlorate complex from EP 1910454.

Mention should additionally be made by way of example of chalks or coated chalks as fillers, though the fillers are not limited thereto.

A further component which can be added to the stabilizer composition of the invention is titanium dioxide. Titanium dioxide occurs in nature essentially in three polymorphs: anatase, brookite and rutile.

An inventive stabilizer composition may further comprise lubricants such as montan wax, fatty acid esters, purified or hydrogenated natural or synthetic triglycerides or partial esters, polyethylene waxes, amide waxes, chloro-paraffins, glyceryl esters or alkaline earth metal soaps. Usable lubricants are additionally also described in "Plastics Additives Handbook", H. Zweifel/R. D. Maier/M. Schiller, Carl Hanser Verlag, $6^{th}$ edition, 2009, p. 539-579.

Additionally suitable as lubricants are, for example, fatty ketones as described in DE 4204887 and silicone-based lubricants as specified, for example, by EP-A 0 259 783, or combinations thereof as specified in EP-A 0 259 783. Reference is hereby made explicitly to the documents cited; the disclosure thereof relating to lubricants is considered to form part of the disclosure of the present text.

In order to process PVC profiles, sheets and sidings comprising the inventive stabilizer composition, the processes known in the prior art can be used. Examples of such processes include, but are not limited to, extrusion and the like.

The present invention accordingly makes a remarkable and new contribution to the development of the prior art, especially for the processing and stabilization of PVC profiles and other halogenated thermoplastic polymers.

The invention is illustrated in detail by the examples which follow, but without being limited thereto.

The examples which follow describe various compositions of PVC window profiles. They have been produced by weighing in, in addition to S-PVC, chalk with surface treatment, titanium dioxide and acrylate-based impact modifier, the constituents specified in the examples. All components were heated to 120° C. in a hot mixer within 5 h, cooled to 40° C. within 5 min, then stored for 24 h and subsequently extruded on a parallel twin-screw extruder from Brabender for 20 min. The individual compositions are reproduced in tables 1 and 2 below.

TABLE 1

Inventive stabilizer combinations (dryblend composition 100.0 phr of S-PVC (k = 67), 4.0 phr of Kronos 2220 (titanium dioxide), 7.0 phr of Omya 95T 6.0 phr of DMA 600 (acrylate-based impact modifier from Akdeniz Kimya AS), 1.8 phr of Aklub 476 (lubricant combination for extrusion of tin-stabilized window profiles; Akdeniz Kimya AS) 0.1 phr of Irganox 1010 (antioxidant; BASF), 0.1 phr of magnesium hydroxide), x · y phr of the inventive stabilizer combination)

|  | A1 | A2 | A3 | A4 | A5 |
|---|---|---|---|---|---|
| Caacac[1] | 0.50 | 0.44 | 0.60 | 0.41 | 0.40 |
| calcium laurate |  | 0.29 |  |  | 0.18 |
| calcium benzoate |  |  |  | 0.23 |  |
| Znacac[2] |  | 0.17 |  | 0.22 | 0.11 |
| zinc stearate | 0.30 |  |  |  |  |
| zinc laurate |  |  |  |  | 0.19 |
| zinc benzoate |  |  | 0.25 |  |  |
| THEIC | 0.70 | 0.60 | 0.60 | 0.40 | 0.60 |
| Total | 1.50 | 1.50 | 1.45 | 1.25 | 1.48 |
| Gloss (%) | 56 | 60 | 61 | 62 | 62 |
| L | 93.0 | 93.1 | 93.3 | 93.5 | 93.3 |
| a | −1.0 | −1.0 | −1.0 | −1.0 | −0.9 |
| b | 2.6 | 2.9 | 2.9 | 2.9 | 2.7 |
| DHC (min.) | 46 | 50 | 52 | 55 | 49 |
| Torque (Nm) | 184 | 183 | 186 | 187 | 183 |
| Melt pressure (bar) | 152 | 153 | 154 | 154 | 152 |

[1]Calcium acetylacetonate
[2]Zinc acetylacetonate

TABLE 2

Noninventive stabilizer combinations (dryblend composition 100.0 phr of S-PVC (k = 67), 4.0 phr of Kronos 2220 (titanium dioxide), 7.0 phr of Omya 95T, 6.0 phr of DMA 600 (acrylate-based impact modifier from Akdeniz Kimya AS), 1.8 phr of Aklub 476 (lubricant combination for extrusion of tin-stabilized window profiles; Akdeniz Kimya AS) 0.1 phr of Irganox 1010 (antioxidant; BASF), 0.1 phr of magnesium hydroxide), x · y phr of the noninventive stabilizer combination)

|  | B1 | B2 | B3 | B4 | B5 | B6 | B7 | B8 |
|---|---|---|---|---|---|---|---|---|
| Irgastab 17 M | 1.20 |  |  |  |  |  |  |  |
| Rhodiastab 55 |  |  |  |  |  |  | 0.20 | 0.20 |
| Caacac |  |  | 0.50 | 0.50 | 0.50 | 0.50 | 0.20 | 0.20 |
| zinc stearate |  | 0.30 |  | 0.30 | 0.30 | 0.30 | 0.60 | 0.60 |
| THEIC |  | 0.70 | 0.70 |  |  |  | 0.20 | 0.20 |
| di-TMP |  |  |  |  | 0.70 |  | 0.70 |  |
| Alcamizer 1 |  |  |  |  |  | 0.70 |  | 0.70 |
| Total | 1.20 | 1.00 | 1.20 | 0.80 | 1.50 | 1.50 | 1.20 | 1.90 |
| Gloss | 55 | 44 | 62 | 62 | 59 | 57 | 53 | 55 |
| L | 92.6 | 90.0 | 90.8 | 92.6 | 92.1 | 91.8 | 92.2 | 91.8 |
| a | −0.8 | −1.1 | −1.9 | −1.0 | −1.0 | −1.6 | −0.8 | −0.9 |
| b | 2.3 | 7.1 | 7.2 | 3.3 | 2.8 | 5.8 | 2.8 | 2.7 |
| DHC | 49 | 34 | 34 | 36 | 44 | 51 | 28 | 35 |
| Torque | 183 | 196 | 197 | 179 | 185 | 182 | 155 | 164 |
| Pressure | 159 | 159 | 159 | 155 | 154 | 147 | 137 | 142 |

The rheology (torque and melt pressure) of the inventive combination (tab. 1) agrees with comparative example B1, a commercial tin stabilizer. A comparable and in some cases better starting color (L a b values) and a comparable or slightly better gloss are likewise obtained. The statistical thermal stability (DHC=dehydrochlorination) is, according to the costabilizer used, within a comparable range or above the DHC value of comparative example B1.

If example A1 is compared with B2 (without Caacac), it is found that comparative example B2
- is darker (lower L value)
- is yellower (higher b value)
- has lower stability (lower DHC value)
- is less glossy
- the torque in the extrusion is much higher.

If example A1 is compared to B3 (without zinc stearate), it is found that comparative example B3
- is darker (lower L value)
- is greener (lower a value)
- is yellower (higher b value)
- has lower stability (lower DHC value)
- the torque in the extrusion is much higher.

If example A1 is compared with B4 (without THEIC), it is found that comparative example B4
- is yellower (higher b value)
- has lower stability (lower DHC value)
- is less glossy
- the torque in the extrusion is much lower.

It can be concluded from this that the presence of all inventive constituents is necessary to obtain a technically and economically acceptable substitute for tin stabilizers.

Comparative example B5 is directly comparable to A1. However, B5 contains di-TMP (analogously to the THEIC in A1, it likewise contains 3 OH groups) instead of THEIC. B5 is distinctly inferior to A1 in terms of performance.

With Alcamizer 1, a hydrotalcite which acts as an acid scavenger and is present in many commercially available calcium-zinc onepacks, instead of THEIC in comparative example B6, acceptable DHC values are obtained, but a much yellower profile compared to inventive example A1.

Comparative examples B7 and B8 are adapted from commercially available onepacks when the lubricants, antioxidants, etc from the table heading are included. However, the strong rheological influence of zinc stearate is manifested here. The DHC values are much lower than in A1 or B1. The gloss appears to be reproducible. However, the gloss increases in inverse proportion to torque. A higher torque which is thus comparable with A1 would mean a loss of gloss.

We claim:

1. A stabilizer composition for halogenated polymers comprising at least one zinc salt of a carboxylic acid and/or of a β-diketone, comprising a metal salt of the carboxylic acid which may be unbranched, branched, aromatic, saturated and/or unsaturated, and mono- or polybasic, and has 1 to 100 carbon atoms, and the metal salt is selected from the group of the following metals: Li, Na, K, Mg, Ca, Al and Zn, a metal salt of the β-diketone which is selected from the group consisting of acetylacetone and Ph—CO—CH₂—CO—R, where R is in turn an aromatic or an alkyl radical having 1 to 20 carbon atoms, and the metal salt is selected from the group of the following metals: Li, Na, K, Mg, Ca, Al and Zn, at least one amino alcohol derivative of the general formula (I)-(III)

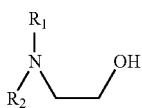

(I)

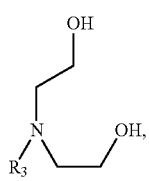

(II)

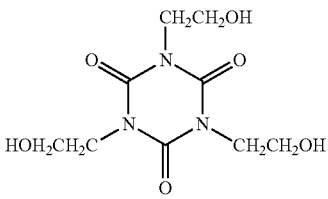

(III)

where R1 and R2 are each independently H or CH₂CH₂OH, and R3 is a cyclic, acyclic, linear and/or branched alkyl radical having 18 carbon atoms, and wherein calcium oxide and calcium hydroxide are not present.

2. The stabilizer composition for halogenated polymers as claimed in claim 1, wherein the stabilizer composition is present in a total dosage of 0.5-2.5 parts per 100 parts of resin (phr).

3. The stabilizer composition for halogenated polymers as claimed in claim 2, comprising more than 0.2 phr of the metal salt of the β-diketone and/or more than 0.4 phr of the amino alcohol.

4. The stabilizer composition for halogenated polymers of claim 1, additionally comprising at least one further component selected from the group consisting of: an antioxidant, a β-diketone, an iso-cyanurate, a polyol, a perchlorate compound, a lubricant, a metal compound, preferably from the group of hydrotalcite, metal oxides and metal hydroxides, a filler, a pigment, a UV stabilizer, a dihydropyridine, an epoxy compound, an organic phosphite or a uracil compound, a melamine, an amino acid, a blowing agent, a plasticizer.

5. The stabilizer composition for halogenated polymers of claim 1, as a molten product.

6. A PVC composition in the form of pellets or of a "dry-blend", comprising the stabilizer composition for halogenated polymers of claim 1.

7. A PVC molding comprising the stabilizer composition for halogenated polymers of claim 1.

8. The use of the stabilizer composition of claim 1 for stabilization of a PVC composition for the production of products used in the exterior sector.

* * * * *